(12) United States Patent
Goldband et al.

(10) Patent No.: US 10,332,133 B2
(45) Date of Patent: Jun. 25, 2019

(54) SYSTEM AND METHODS FOR FILTERING BASED ON SOCIAL MEDIA

(71) Applicant: CBS INTERACTIVE INC., San Francisco, CA (US)

(72) Inventors: Adam Goldband, Antioch, CA (US); Andrew Shirey, San Francisco, CA (US); Adam Hiatt, San Francisco, CA (US)

(73) Assignee: CBS INTERACTIVE INC., San Francisco, CA (US)

( * ) Notice: Subject to any disclaimer, the term of this patent is extended or adjusted under 35 U.S.C. 154(b) by 0 days.

(21) Appl. No.: 16/027,435

(22) Filed: Jul. 5, 2018

(65) Prior Publication Data

US 2019/0005517 A1    Jan. 3, 2019

Related U.S. Application Data

(63) Continuation of application No. 13/153,376, filed on Jun. 3, 2011, now abandoned.

(51) Int. Cl.
*G06Q 30/02* (2012.01)
*G06Q 50/00* (2012.01)

(52) U.S. Cl.
CPC ......... *G06Q 30/0201* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,239,364 B2 | 8/2012 | Wable et al. | |
| 2006/0004892 A1 | 1/2006 | Lunt et al. | |
| 2006/0235873 A1 | 10/2006 | Thomas | |
| 2008/0133495 A1 | 6/2008 | Fischer | |
| 2009/0125934 A1 | 5/2009 | Jones et al. | |
| 2011/0087968 A1 | 4/2011 | Lakshmanan et al. | |
| 2011/0202968 A1* | 8/2011 | Nurmi | G06F 21/10 726/1 |
| 2012/0124478 A1 | 5/2012 | King et al. | |
| 2012/0158633 A1 | 6/2012 | Eder | |

* cited by examiner

*Primary Examiner* — Jeffrey R Swearingen
(74) *Attorney, Agent, or Firm* — Rimon PC; Marc S. Kaufman (57) ABSTRACT

Systems, computer-implemented methods, and media for providing a graph of assets by one or more computing devices include building an asset graph from a data set of assets, the asset graph including plural assets, at least one connection connecting each asset to one or more other asset in the graph, and metadata associated with each connection storing details relating to the connection; identifying an asset in the asset graph that corresponds to an asset in a third party social media platform's asset graph; requesting information relating to connections to the identified asset; receiving the requested information relating to connections to the identified asset; and building out the asset graph according to the received information.

15 Claims, 5 Drawing Sheets

SYSTEM AND METHODS FOR FILTERING BASED ON SOCIAL MEDIA

CROSS-REFERENCE TO RELATED APPLICATION

This application is a continuation of U.S. patent application Ser. No. 13/153,376, filed on Jun. 3, 2011. The entire content of this application is incorporated herein by reference.

BACKGROUND

Social networks are generally made up of individuals (i.e., "nodes") connected by one or more specific types of connections (i.e., "ties"). Commercially available social network platforms, such as the FACEBOOK™ platform, allow users to connect to each other over the internet by "friending" each other (i.e., creating a "friend" connection between users). Some social network platforms have expanded to represent objects in addition to individuals and the connections between individuals and those objects. For example the FACEBOOK™ platform has expanded to include objects (e.g., users, photos, and webpages), and the connections between them (e.g., friendships, photo tags, and likes). In addition to allowing users to easily stay in touch with old friends and meet new friends through connections from existing friends, the connections involved in social networks may be useful for inferring interests of a user.

A social graph is a concept that describes the relationship between online users defined explicitly by the connections between the users. For example, the FACEBOOK™ graph Application Program Interface ("API") allows third parties to access objects in the graph and the connections associated with objects. It has long been known that graph analysis can lead to insights. Social graphs may be mined, for example by collaborative filtering, to infer user preferences.

However, social graphs keep minimal data about the connections themselves. For example, the FACEBOOK™ platform provides that a connection between users may be a "friend" connection and that a connection between a user and a product may be a "like" connection; however connections other than those specifically defined by the platform must be inferred. This may lead to misguided inferences because the lack of data about the connection (i.e., connection metadata).

For example, mere knowledge of the fact that users "like" plural products may lead to misguided inferences without structured information relating the connections or to the plural products. As a simple example, a first user may like a PLAYSTATION 3™ and a second user, who is a friend of the first user, may like an LG™ Blu-ray player. Conventional methods of inferring user preferences may infer that the first user would like the LG™ Blu-ray player because his friend does. However, because the PLAYSTATION 3™ has an integrated Blu-ray player, the first user may not like any stand-alone Blu-ray player and instead find standalone Blu-ray plays to be unnecessary peripherals.

While increasingly large data sets and increasingly sophisticated data mining techniques may help to improve the quality of inferences mined from graphs, the improvement comes at a great cost of data gathering and processing. Further, individual connections between objects in a graph may seem anomalous simply because of a lack of understanding of the connection.

While systems and methods are described herein by way of example and embodiments, those skilled in the art recognize that systems and methods for using social media data to form connections between assets are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for receiving connections between assets from external sources and using that information for connecting assets in an internal graph. Methods and systems may use third party sources to identify relations between socially connected assets and assets arranged in an ontology.

Relational databases are known for storing vast amounts of structured data according to common relations. For example, a data set may store plural assets organized according to a hierarchical taxonomy having a tree structure. Assets may be technology products organized by a type of product, such as computers, mobile phones, televisions, gaming consoles, computer peripherals, etc. Within each type of product, products may be organized by manufacturer, for example computer type products may be divided into DELL™, APPLE™, HP™, etc. computers. Within each manufacturer, products may further be divided into form factor, such as laptop, desktop, tablet, etc. Products may continue to be divided into increasingly narrow categories by features such as processor speed, memory, etc.

Each of these categories may be thought of as an attribute-value pair. For example, a specific product may have an attribute "product type" and corresponding value "computer", attribute "form factor" and value "laptop", attribute "manufacturer" and corresponding value "LENOVO™", attribute "product line" and value "IDEAPAD™", attribute "product series" and value "Y series", attribute "product model" and value "560d", attribute "memory" and value "4 GB", attribute "weight" and value "under 6 lbs", and so on.

Of course, some products may have different attributes than others. For example, computer products having a "laptop" form factor may have a weight attribute while other products having a "desktop" form factor may not. Hierarchical taxonomies additionally may allow for inheritance of attributes and values, thereby saving resources and simplifying catalog build-outs.

Additionally, while a taxonomy having a tree structure provides efficient organization of assets and allows for quick searching of assets stored in a data set, alternative ontologies may arrange assets in one or more many-to-many relationships. For example, while a product type of computers may be divided by form factors at the highest level in a taxonomy and at every lower level be subdivided by an attribute and its corresponding values, many-to-many ontologies allow for a more flexibly structured organization of related assets. By arranging assets in such a fashion, assets may be navigated according to any of their attribute values, for example via an asset ontology index. A user navigating a catalog of assets may filter the assets according to any asset attribute value or range of values. For example, a user may narrow a catalog of technology products to include all assets having a product type "gaming console" and, in response, may receive a listing of assets including an "XBOX 360™" and a "PLAYSTATION 3™". Alternatively, the user may narrow the same catalog of technology products to include all assets having a drive type asset and value "Blu-ray" and, in response, receive a listing including "PLAYSTATION 3™" and "LG™ BD590".

Arranging assets in a structured ontology thus may provide detailed information about the connections between assets. This connection information may be useful for arranging the assets in an asset graph having each connection between assets stored in a data set with metadata providing information about each connection. For example, a connection between an XBOX 360™ asset and a PLAYSTATION 3™ asset may include metadata explaining that the assets are connected because they are both gaming consoles. At the same time, a connection between a PLAYSTATION 3™ asset and a LG™ BD590 asset may include metadata explaining that the assets are connected because they both include Blu-ray players. The metadata may include additional information about a connection, for example the strength of a connection.

While the above examples provide data sets arranging technology product assets such as computers, gaming consoles, and television peripherals, asset ontologies and asset graphs may arrange data sets of any type of asset. For example, streaming or downloadable content may be organized by types of content (e.g., TV shows, movies, video product reviews, user generated content (e.g., YOUTUBE™ videos), etc.), delivery of content (e.g., downloadable, streaming, etc.), genre of content (e.g., documentary, comedy, etc.) and any other appropriate attributes and values with each attribute-value pair determining an asset's classification within an asset ontology or providing a connection between assets in an asset graph. Likewise, textural content assets may be organized by, for example, types of content (e.g., product reviews, news articles, blog posts, novels, etc.), access rights of the content (e.g., subscription, freely available), and delivery of the content (e.g., website, e-book, print publication). Of course, these are only exemplary assets; assets may be any data that may be logically organized, such as people, computer games, services, etc.

Further, connections may span across data sets of assets or assets of different types. For example, an asset may be an online editor (i.e., a person) who writes reviews of products. Thus, a graph may connect the editor with the articles he or she wrote and each article may be connected to the products reviewed in the article. The connections themselves may include metadata explaining the respective connection. For example, the connection between an editor and a product review may indicate that the editor wrote the product review, thus differentiating the connection between the editor and the product review from a connection between a user who read and "liked" the product review and the product review (i.e., the connection between a user who read the product review and used a tool through the FACEBOOK™ platform to indicate their like of the review, thus creating a connection in the FACEBOOK™ graph between the user and the product review).

Additionally, connections may include metadata showing an opinion. For example, a product review article may have connections to each of the products reviewed therein. However, these connections may provide little value without knowing the opinion creating the connection. In other words, useful inferences cannot be drawn from merely knowing that a reviewer reviewed a product, but inferences may drawn based on whether the product received a positive review or a negative review and why. Thus, the metadata associated with a connection between a reviewer and a product may include an opinion, a degree or strength of the opinion, and like information. Similar connections may be made between the editor and each product reviewed.

In addition to assets having common attribute values being connected, allied assets may be connected. Allied assets may have different attribute values, but may be complementary assets. For example, a ream of paper may be connected to a printer and metadata associated with the connection may indicate that the assets are allied because the ream of paper is a supply used by the printer. Other allied assets may be accessories or other complementary assets, for example, a stroller and a cup holder configured to be mounted to a stroller may be allied assets. Still other allied assets may be products and related services, such as a mobile phone and a service (e.g., voice or data) plan for the mobile phone or a car and a bumper to bumper warranty. Of course, these allied assets are exemplary only. Any assets having substantially different attribute values but being allied may be connected and the connection metadata may include information about the connection such as the fact that the assets are allied (as opposed to similar), the strength of the alignment, how the assets are aligned, and the like.

Similarly, assets in the graph may be connected to one or more digital content assets. For example, a sports product, such as a baseball bat, may be connected to video games relating to baseball (e.g., video games for purchase, video games for download, streaming video games, etc.), may be connected to streaming or downloadable video (e.g., a connection may be made to streaming or downloadable movies related to baseball, a connection may be made to live streaming programming, for example through <MLB.COM>, a connection may be made to a scheduled time for network programming related to baseball, etc.), and may be connected to creatives (e.g., advertisements) relating to baseball. Each connection between the bat and another asset may include metadata about the connection. Of course, as described above, a bat may also be connected to similar products (e.g., bats having similar attribute values), allied assets (e.g., baseballs to hit with the bats, pine tar for gripping the bat, etc.), players who use the bat (e.g., a professional player who plays with the bat), users who "like" the bat (e.g., users who select FACEBOOK™ "like" when viewing a webpage showing the bat), users who search for the bat (e.g., a user who searches for a specific bat in GOOGLE™), and the like. Each connection may include metadata about the connection.

As the foregoing describes, arranging assets into highly structured ontologies and into asset graphs may provide many uses. For example, by improving navigation of assets through online catalogs and using online filters, improving free language searching of assets by knowing the relation between assets and thus returning assets related to a search term rather than merely assets that explicitly contain a search term, suggesting assets related to or allied with an asset a user is browsing or searching, and providing ads to a user related to an asset.

While connections between assets arranged in an ontology are useful for organizing assets and recommending assets to users, such organization and recommendations based purely on the ontology may be limited to relations of closely related assets, closely allied assets, and the like. A website hosting content may acquire a great deal of user information based on their viewing habits, for example the content the user views and interacts with on the website, metadata received from a referring website (e.g., if the user navigated to the site through a GOOGLE™ search), cookies present on the user's computing device, express information provided by the user (e.g., user preferences and profile information), and the like. This information may be useful for recommending assets to a user, selecting directed advertisements to display to a user, and the like. Still, the quality of such recommendations may be further personalized by analyzing social media data relating to the user. Due to the rapid growth of social media and its integration into many websites, vast amounts of data about a user's connections may be retrieved from one or more third party social media platforms and this data may be used to personalize recommendations to the user based on an asset ontology. In other words, the quality (i.e., highly structured) connections of an asset ontology may be supplemented with the high quantity (i.e., vast number of connections, each providing little structure) connections of social media platforms to provide recommendations of assets of greater interest to the user.

This information may also be useful to infer connections between assets. This allows for a graph of assets to be built out which may include connections between assets inferred based on data extracted from a social media platform and may include at least one asset in the graph for a specific user.

Figure 1A:
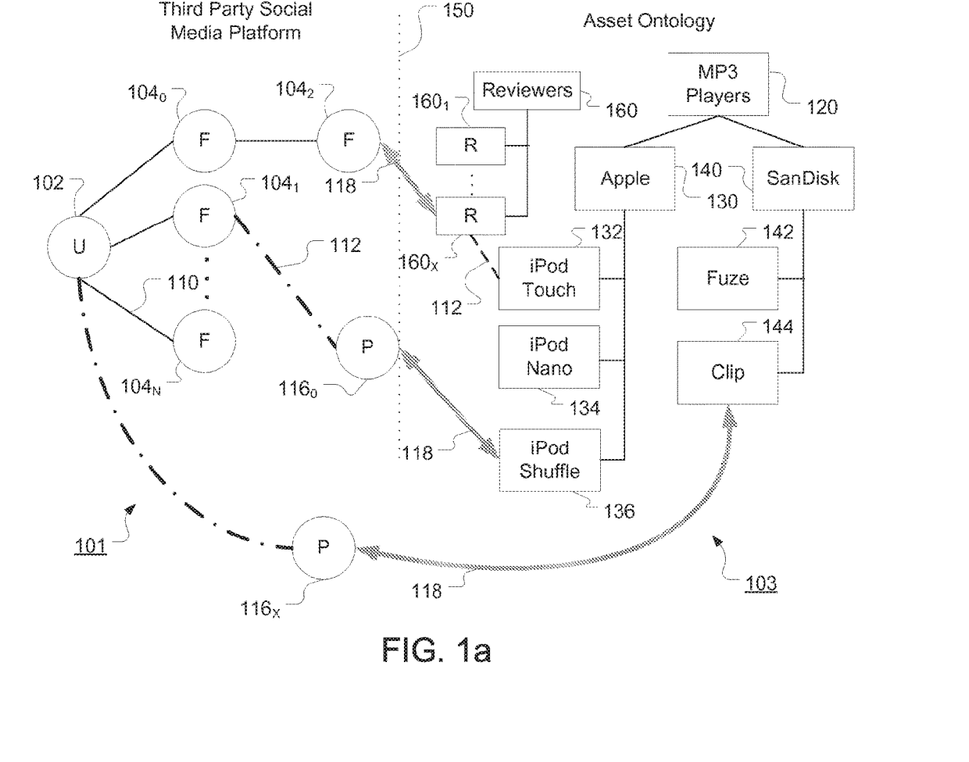
FIG. 1a shows a conceptual diagram of an ontology logically connected to a graph from a third party social media platform.

FIG. 1a shows a conceptual diagram of an ontology logically connected to a graph from a third party social media platform. The right side of the diagram shows an exemplary portion of a simplified asset ontology. The asset ontology includes a category reviewers 160 (i.e., editors who write reviews of products) and plural reviewers 160₀ and 160ₓ organized under the category reviewers 160. The asset ontology also includes a category of MP3 players 120 and within MP3 players 120 are categories manufacturer APPLE™ 130 and SANDISK™ 140. Within APPLE™ 130 are the assets IPOD™ touch 132, IPOD™ nano 134 and IPOD™ shuffle 136. Additionally, within SANDISK™ 140 are assets FUZE™ 142 and CLIP™ 144. The assets under the MP3 player 120 category are shown in a hierarchical tree structure to ease illustration of sets of connections amongst plural assets, however, an ontology may organize such assets in alternative fashions.

Alternatively, in a graph structure assets within the APPLE™ category may be shown as each connected to each other based on their manufacturer. Likewise, in a graph structure the assets within the SANDISK™ category may be each connected to each other based on their manufacturer. In other words, a connection may be defined between IPOD™ shuffle 136 and IPOD™ nano 134 and the connection may have metadata describing an asset value pair for the connection (e.g., attribute=manufacturer; value=APPLE™). Additionally, all assets IPOD™ touch 132, IPOD™ nano 134, IPOD™ shuffle 136, FUZE™ 142, and CLIP™ 144 may have connections to each other and each connection may contain metadata indicating that the assets are connected because they are all MP3 players (e.g., attribute=producttype; value=mp3player).

Of course, an asset graph is not limited to the connections shown in the tree structure; additional connections may be made according to further attribute value pairs, for example the IPOD™ shuffle 136 and CLIP™ 144 may be connected by virtue of having a "micro" form factor (e.g., attribute=formfactor; value=micro).

The left side of FIG. 1a shows a graph 101 of assets connected to a user retrieved from a third party social media platform. The exemplary graph shows a user 102 "friend" connected to plural friends 104₀, 104₁, . . . , 104ₙ and "like" connected to a product 116ₓ. As shown, friends can be directly "friend" connected, for example user 102 is directly "friend" connected to friend 104₀ or they can be connected through a chain of "friend" connections, for example user 102 is "friend" connected to friend 104₂ via friend 104₀. Graph 101 also shows friend 104₁ "like" connected to product 116₀. Of course, the asset ontology and third party social media platform shown each have only a few assets, but in practice asset ontologies and third party social medium platforms may include connections between thousands, millions, or more assets.

FIG. 1a additionally shows connections 118 between known structured information within an asset ontology and information that may be gathered from a third party social media platform. For example, friend 104₂ in graph 101 may be a reviewer 160ₓ in an asset ontology, product 116₀ in graph 101 may be IPOD™ shuffle 136 in an asset ontology, and product 116ₓ in graph 101 may be CLIP™ 144 in an asset ontology. The asset ontology may provide highly structured data regarding connections between the assets and a third party social media platform may provide more loosely structured data regarding connections between the assets. For example, the asset ontology may provide detailed information regarding one or more product the reviewer has reviewed, such as IPOD™ touch 132. The detailed information may include not only whether reviewer 160ₓ liked or disliked the IPOD™ touch 132, but may include further metadata including details indicating reviewer 160ₓ opinions regarding specific attributes of the IPOD™ touch 132. For example, the metadata may indicate that reviewer 160ₓ gave the IPOD™ touch 132 a negative review and indicated that its size is inconveniently large in comparison to current "micro" form factor MP3 players according to the reviewer.

Additionally, information may be received from the third party social media platform, for example through the FACE-BOOK™ graph API, indicating assets connected to friend 104₂ and the type of connection between friend 104₂ and each connected asset. For example, in the simple graph of FIG. 1a, a request may be made to the third party social media platform's API for all users "like" connected to friend 104₂ and in response to the request the third party social media platform may identify friend 104₀. Additionally, the type of connection may be identified by the third party social media platform's APL In like fashion, once friend 104₀ is identified, information about assets and connections connected to friend 104₀ may be retrieved from the third party social media platform as well. In this fashion, a system may continue to request information from the third party social media platform to discover greater portions of or the entire third party social media platform's graph 101.

Of course, requests to a third party social media platform may be limited by security features put in place by the platform. For example, a user may expressly allow the third party social media platform to disclose their connections by logging into a system configured to interact with the third party social media platform. Alternatively, a user may adjust their settings on the third party social media platform to either allow systems to generally access their connections, such as through an API, or to specifically allow a system associated with an asset ontology to access their connections. Of course, embodiments may be designed to work with evolving security and privacy systems to ensure both privacy of user information and access to user connections.

When interacting with a third party social media platform that only allows access to information regarding users, objects, and the like directly connected to a user, embodiments may be configured to build out an asset graph by only requesting connections from assets specifically giving permission. For example, because friend $104_2$ is also reviewer $160_x$, reviewer $160_x$ may expressly allow the third party social media platform to share information relating to their connections with a system. Thus, a system may request all connections to friend $104_2$ and, in response, may receive information that friend $104_0$ is "friend" connected to friend $104_2$. In similar fashion, when user 102 "likes" product $116_x$ offered by a system's online catalog, the system may have received access from user 102 to request their connections. The system may then request all connections to user 102 and, in response, may receive information that user 102 is "friend" connected to friends $104_0$, $104_1$, and $104_N$. The system may then identify that friend $104_0$ who is "friend" connected to user 102 is the same friend $104_0$ who is friend connected to friend $104_2$, thus connecting the assets discovered through the two requests. While such embodiments may only allow discovery of assets directly connected to known assets, the predominance of social media may allow for a detailed and informative graph 101 to be discovered by a system in a relatively short time span.

Figure 1B:
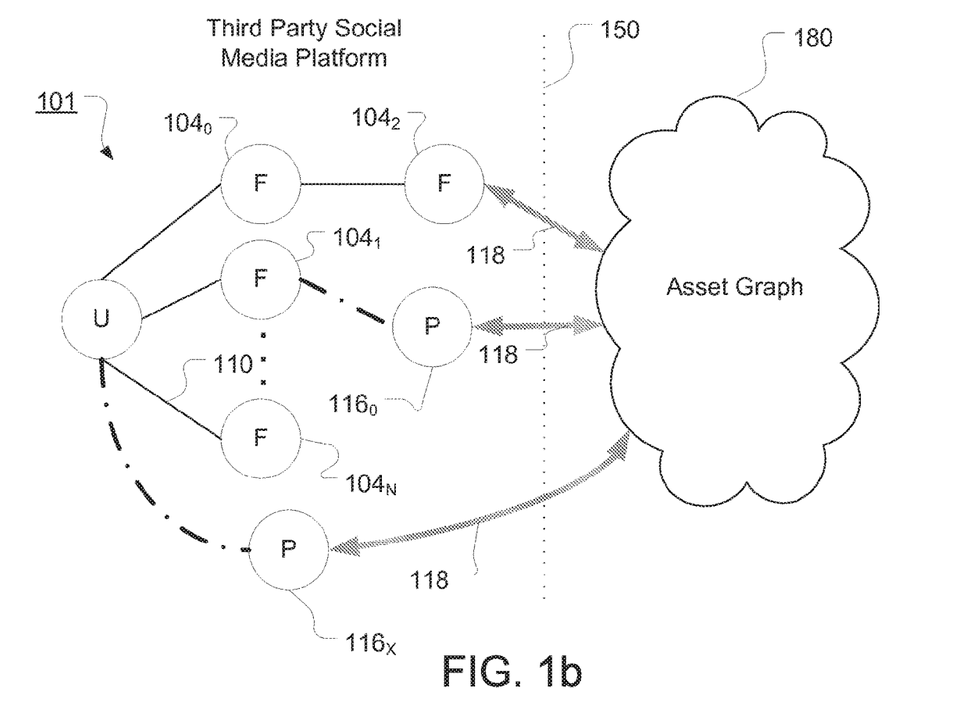
FIG. 1b shows a conceptual diagram of a third party social media platform's graph coupled to an asset graph.

Referring now to FIG. 1b, the same third party social media platform graph 101 is shown coupled to an asset graph 180. Asset graph 180 may be a graph of assets in the asset ontology of FIG. 1. Line 150 may represent a firewall separating asset graph 180 hosted on an internal computing device from one or more third party social media platforms which may, for example, be hosted with publicly accessible APIs. Asset graph 180 may include assets from a highly organized asset ontology and structured connections between those assets. Initially, the structured connections may include connections between similar assets and between allied assets and include metadata describing each connection. A system may then build out asset graph 180 to include additional assets and asset connections received from one or more third party social media platforms. The connections between the built out assets may include limited metadata including known information about the connection such as the third party social media platform that the connection as received from (e.g., FACEBOOK™, LINKEDIN™, TWITTER™, etc.). The system may also infer additional connections between any assets in the graph. Inferred connections may include metadata describing the inferred connection and metadata indicating that the connection is inferred. The indication that the connection is inferred may be useful for forming future inferences when an inferred connection and another connection appear to conflict or not synchronize with each other.

Figure 1C:
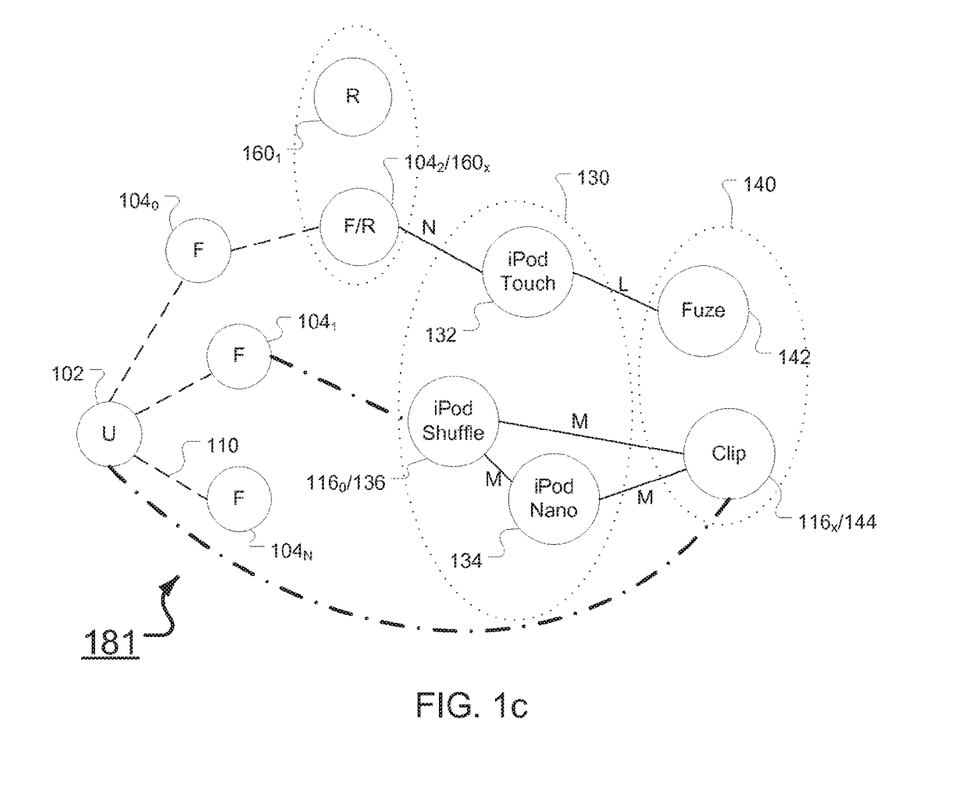
FIG. 1c shows a conceptual diagram an asset graph including assets from the asset ontology of FIG. 1a. organized in an asset graph including assets and connections from a third party social media platform's graph.

FIG. 1c is a conceptual diagram of a built out asset graph 181 including assets from the asset ontology 103 of FIG. 1a. organized in an asset graph and built out to include assets and connections from third party social media platform's graph 101. Assets in the asset graph 181 may be connected by highly structured connections (i.e., connections having metadata indicating information about the connection). For example, each of assets IPOD™ shuffle $116_0/136$, IPOD™ nano 134, and CLIP™ $116_x/144$ may be connected by their common attribute value of having a "micro" form factor. In other words, a connection may be formed between each of these assets and metadata associated with the connection may indicate that the assets are connected because they each have a "micro" form factor. Likewise, IPOD™ touch 132 and FUZE™ 142 may be connected by their common attribute value of having a "large" form factor.

For the ease of illustration, many additional structured connections between assets based on the asset ontology of FIG. 1a. are omitted from FIG. 1c. Additional connections, for example, may be connections between each asset in asset group APPLE™ 130 and connections between each asset in asset group SANDISK™ 140 with each of the connections having metadata indicating the assets manufacturer or connections between all assets in both the asset group APPLE™ 130 and the asset group SANDISK™ 140 with metadata indicating the assets are MP3 players. Further, IPOD™ touch 132 and IPOD™ shuffle $116_0/136$ may be connected by their common attribute value of touch screens, IPOD™ touch 132, IPOD™ shuffle $116_0/136$, and FUZE™ 142 may be connected by their common attribute value of color screens, and so on.

In building out the asset graph 181, a computing device may determine assets in a third party social media platform's graph 101 that correspond to assets in the asset graph 180 (shown in FIG. 1b) and associate the assets together as a single asset. For example, FIG. 1a. showed that friend $104_2$ was the same as reviewer $160_x$ in the asset ontology, so FIG. 1c shows asset graph 181 built out to identify a single asset as both friend $104_2$ and reviewer $160_x$. In this fashion, both the highly structured connections of the product ontology and the loosely structured connections of the social media platform may connect the common asset to other assets. For example, reviewer $104_2/160_x$ may be connected to IPOD™ touch 132 based on a negative review in which the reviewer criticized the large form factor of the IPOD™ touch 132. Likewise, reviewer $104_2/160_x$ may be connected to friend $104_0$ via a "friend" connection.

This also illustrates that building out the asset graph 181 may include adding one or more additional assets. For example, asset graph 181 initially did not include user 102 or friends $104_0$, $104_1$, and $104_N$. During the build out process, one or more assets in a third party social media platform's graph 101 may be added to asset graph 181. Additionally, other products "liked" in graph 101, photos "tagged" in graph 101, or any other assets in graph 101 connected either directly or via a chain of connected assets to an asset in asset graph 181 may be added to asset graph 181. Each asset from graph 101 added to asset graph 181 may additionally include the social connection and indicate the type of social connection (e.g., like, friend, tag, etc.).

Built out asset graph 181 of FIG. 1c includes assets corresponding to people and products, however other asset graphs may include a much broader array of assets as well as a broader array of connection types. For example, other assets may include articles, streaming digital content, downloadable digital content, user generated content, music, or any other type of asset. Additionally, while asset graph 181 is shown in a two-dimensional space in FIG. 1c, asset connections may be relational rather than spatial, and an asset graph may be portrayed in any of many fashions. The portrayal of FIG. 1c provides only an example of how some assets may be connected and metadata that may be associated with some connections.

The embodiment shown in FIG. 1c includes first class assets such as IPOD™ touch 132 that may include multiple other assets or products. For example, IPOD™ touch 132 may include the IPOD™ touch 2010 with 8 gigabytes ("GB") of memory, the IPOD™ touch 2010 64 GB of memory, the IPOD™ touch third generation 8 GB, and others. In this fashion, a greater number of connections between assets may be usefully drawn from third party social media platforms. For example, one user may like an IPOD™ touch 2010 with 8 GB for the same reasons a second user likes the IPOD™ touch 2010 with 64 GB but the second user may simply have more finances. The connection between each user and the first class asset IPOD™ touch 132 may include metadata indicating which specific model of the asset the user "liked" or was otherwise connected to in a third party social media platform. Thus, an asset graph may both provide a greater number of connections to make inferences about first class assets and fewer but more specific connections to make inferences about more specific assets.

Of course, the span for features or models that may be included in a single first class asset may be configured based on the purpose of the asset graph. For example, if the asset graph is designed to serve as a back end of a product catalog configured to offer products to a highly sophisticated audience, fewer models may be grouped in a single first class asset. In still other embodiments, an asset graph may not include first class assets, but rather include an asset for each individual model. While products are used by way of example to explain first class assets versus other assets, first class assets may be used with any asset types. For example, a first class asset for a downloadable or streamable movie may include a theatrical version, an extended directors cut version, and a censored version.

In other embodiments, a first class asset may include an asset graph of second class assets. Second class assets may be any assets more specifically grouped and may themselves still be broader than specific models or versions. For example, in an embodiment a first class asset may be an IPOD™, the asset may include an asset graph of second class assets including plural IPOD™ models, each second class asset may include an asset graph of third class assets including optional memory configurations, and each third class asset may include an asset graph of fourth class assets including plural colors. In such embodiments, the first class asset may be connected with other first class assets and the connections may have metadata relating to the connection (e.g., a user "liked" an article about IPODs™). The same connection may more specifically connect an asset to a second class asset within the first class asset if the connection related to a specific model and the connection may have metadata relating to the connection (e.g., a user "liked" an IPOD™ touch). Connections may connect any class of asset to any other class of asset and metadata associated with the connection may provide information relating to the connection.

In this fashion, lower tier assets may inherit all connections of higher tier assets. In this fashion, many more connections provided by one or more third party social media platforms may be made to a first tired asset, thus providing more data to assist in inferring connections between first tier assets.

Figure 2:
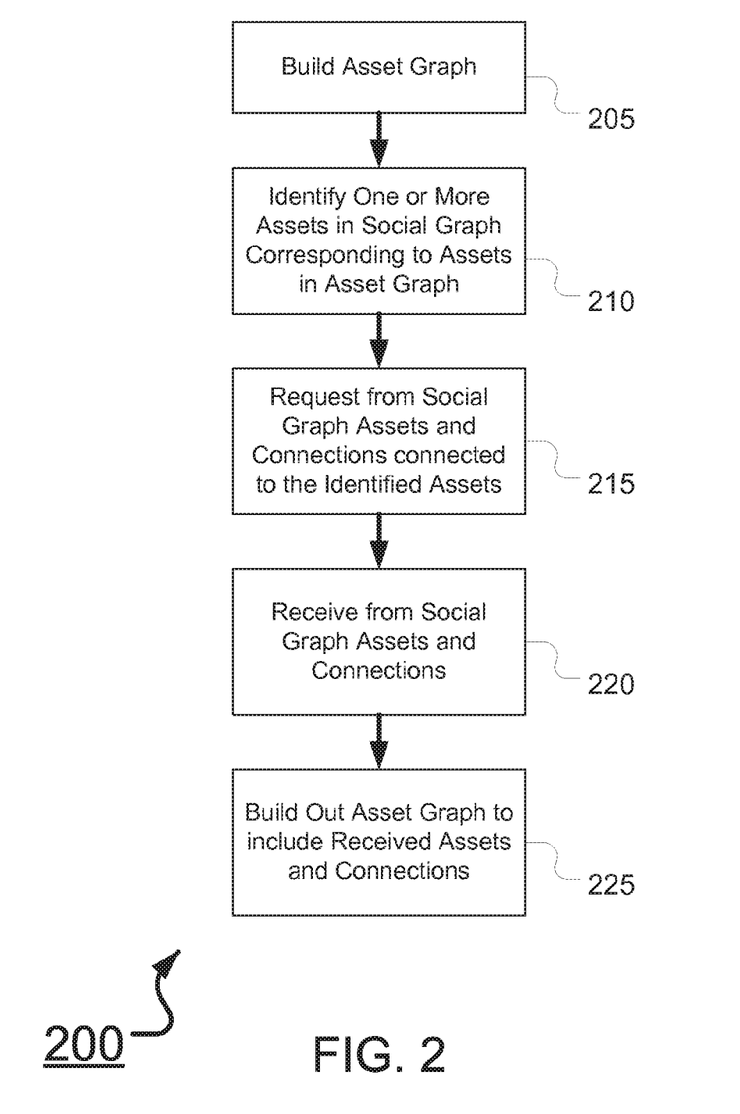
FIG. 2 is a flow chart showing an exemplary method for building out an asset graph to include information from one or more third party social media platforms.

FIG. 2 is a flow chart showing an exemplary method 200 for building out an asset graph to include information from one or more third party social media platforms. In step 205, an asset graph may be built. For example, a computing device may automatically generate a highly structured asset graph based on a structured asset ontology. Alternatively, one or more users may manually enter assets and connections into an asset graph.

In step 210, one or more assets in the asset graph may be identified as having a corresponding asset in a third party social media platform's social graph. For example, a system may detect that a user selects (e.g., clicks) a FACEBOOK™ "like" button in an online product catalog and thereby identify both the logged in user (i.e., a first asset) and the "liked" asset (i.e., a second asset) in the FACEBOOK™ graph. Alternatively, a user may login to a system and consent to the system requesting information from the user's social graph on one or more third party social media platform. A user may choose to expressly consent, for example, so that they may receive more relevant advertisements, personalized search results, and other content tailored to the specific user.

Once one or more assets are identified in step 210, a computing system may request from a third party social media platform's social graph assets and connections connected to one or more of the identified assets. For example, if the third party social media platform is FACEBOOK™, a computing system may request all of a user's connections of a certain type, for example "friends" or "likes". In step 220, a computing system may then receive information relating to assets and/or connections from a third party social media platform connected to the identified assets.

At step 225, a computing system may build out an asset graph to include any received assets and received connections. This step may include identifying received assets that correspond to assets already in the asset graph and associating the received assets with the assets already in the asset graph. This step may also include adding new assets to the asset graph and, if their connections connect the assets to any assets already in the asset graph, connecting the new assets to existing assets. Each connection may include metadata identifying the type of social connection, such as a "like" connection or a "friend" connection for assets received from the FACEBOOK™ graph.

One or more of the steps of method 200 may be performed multiple times to crawl through one or more third party social media platforms to build out asset graphs. Additionally, multiple instances of one or more step may be performed in parallel to more quickly progress through a third party social media platform to build out an asset graph. Alternatively, a third party social media platform may only be interrogated once or a predetermined number of times for connections directly related to an asset already existing in the asset graph without crawling further to determine other assets and connections.

Method 200 is divided into the finite steps shown in FIG. 2 for ease of illustration only, and any or all of the steps may be combined or further subdivided. Each of the steps may be performed by one or more modules executed by a computing device, for example the computing device of FIG. 3.

The method 200 of FIG. 2 may build out the asset graph 181 of FIG. 1c in the following exemplary fashion. In step 205, a computing device may build an asset graph including plural assets, connections between the plural assets, and metadata associated with each connection. The metadata may provide information such as the type of connection, the strength of the connection, the source of the connection (e.g., whether the connection is inferred or not), and the like. For example, an asset graph may be built from the highly structured asset ontology 103 shown in FIG. 1a.

In step 210, a computing device may identify one or more assets in a social graph corresponding to assets in an asset graph. For example, a user 102 logged into FACEBOOK™ may be viewing an online product catalog and click a "like" button when they are viewing a product $116_x$ the user 102 likes. A computing device may thus identify both the user 102 (e.g., based on their FACEBOOK™ login or other unique identification information) and identify the product $116_x$ that the user "liked". The product $116_x$ may be identified as an asset in the asset graph (e.g., CLIP™ 144), thus the asset in the asset graph may be associated with the product in the FACEBOOK™ graph. Additionally, the user 102 may be added to the asset graph 181, a connection may be added between CLIP™ $116_x/144$ and user 102, and metadata may be associated with the connection indicating that the connection is a FACEBOOK™ "like" connection. Alternatively, a computing device may search graph 181 to determine whether user 102 already exists as an asset in the asset graph and add the user as an asset if the user did not exist or connect the existing user to CLIP™ $116_x/144$ if the user already existed in the asset graph.

In step 215, a computing device may request from the FACEBOOK™ graph API assets and connections connected to the identified assets. For example, a request may be made to the FACEBOOK™ graph API for friends of user 102 if user 102 is logged in by making a request to <https://graph.facebook.com/me/friends?access_token= . . . >. In response, at step 220, a computing device may receive from the FACEBOOK™ graph API all of the "friends" in the FACEBOOK™ graph connected to user 102. A computing device may then build out the asset graph in step 225 by determining whether to add the "friends" as assets to asset graph 181 or, if the returned "friends" already exist in asset graph 181, whether to create connections between the assets. Any connections created may include the limited data about the connection provided by the social network (e.g., whether they are a "friend" in FACEBOOK™, whether they are a "classmate", "friend", "colleague", etc. on LINKEDIN™, and the like).

Steps 210 through 225 may be repeated one or more times to more fully build out the asset graph 181. Additionally, multiple instances of method 200 may be run in parallel to request connections made to plural assets simultaneously. For example, a computing device may make substantially simultaneous requests to the FACEBOOK™ graph API for friend connections to friends $104_0$, $104_1$, and $104_N$ in the general format <https://graph.facebook.com/ID/CONNECTION_TYPE?ACCESS_TOKEN= . . . > with the ID being the ID of the asset (e.g., the user, the product liked, the photo tag, etc.), the CONNECTION_TYPE being the type of connection (e.g., friend, like, photo tag, etc.), and the ACCESS_TOKEN identifying an access token if a user has authorized access to their non-publicly accessible information.

Figure 3:
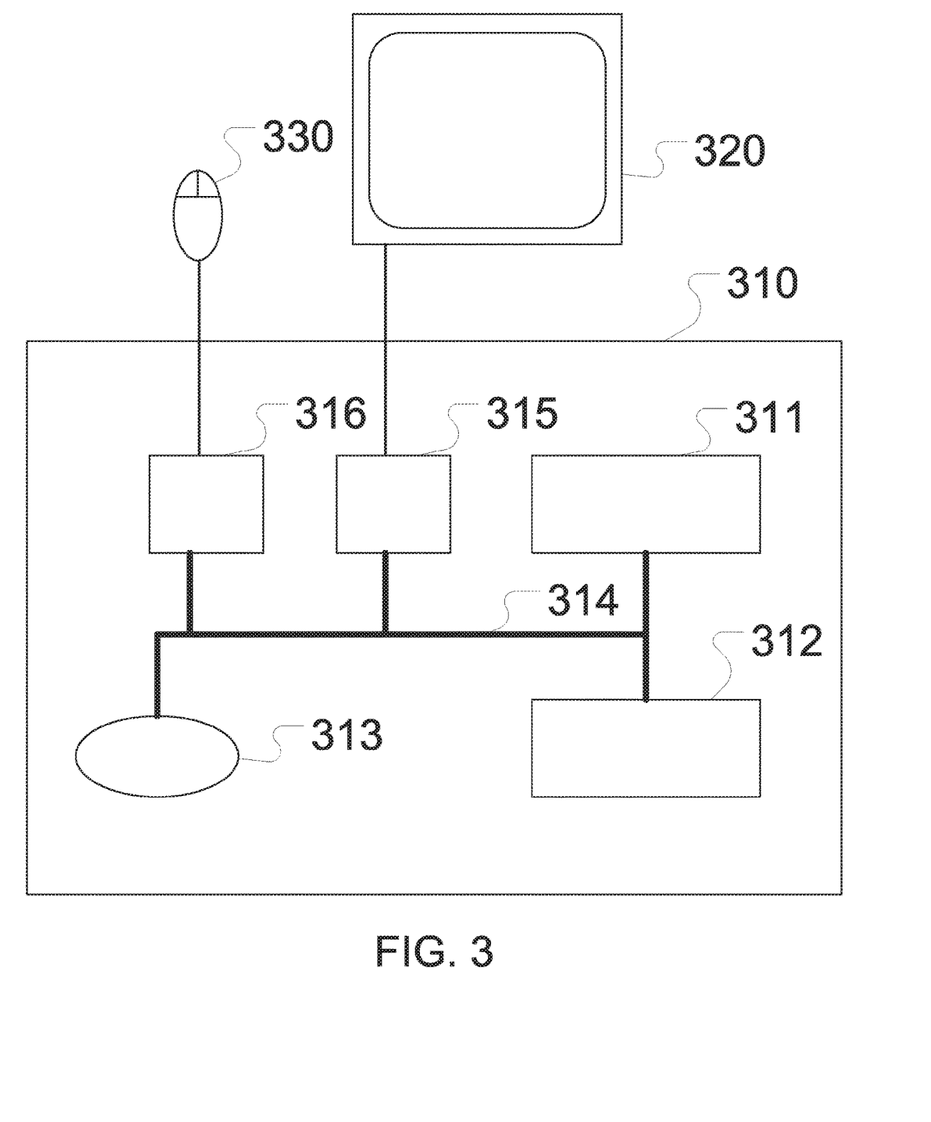
FIG. 3 shows a computing device useful for performing processes disclosed herein.

These embodiments may be implemented with software executed on hardware, for example, functional software modules executed on computing devices such as computing device 310 of FIG. 3. Embodiments may, for example, execute modules corresponding to method 200. Of course, steps may be performed by more than one module, a single module may perform more than one step, or any other logical division of steps of method 200 may be used to implement the data flow as software executed on one or more computing devices.

Computing device 310 has one or more processing device 311 designed to process instructions, for example computer readable instructions (i.e., code) stored on a storage device 313. By processing instructions, processing device 311 may perform the steps set forth in method 200. Storage device 313 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 310 additionally has memory 312, an input controller 316, and an output controller 315. A bus 314 operatively couples components of computing device 310, including processor 311, memory 312, storage device 313, input controller 316, output controller 315, and any other devices (e.g., network controllers, sound controllers, etc.). Output controller 315 may be operatively coupled (e.g., via a wired or wireless connection) to a display device 320 (e.g., a monitor, television, mobile device screen, touch-display, etc.) in such a fashion that output controller 315 can transform the display on display device 320 (e.g., in response to modules executed). Input controller 316 may be operatively coupled (e.g., via a wired or wireless connection) to input device 330 (e.g., mouse, keyboard, touch-pad, scroll-ball, touch-display, etc.) in such a fashion that input can be received from a user (e.g., a user may navigate an online product catalog or click a "like" button relating to a product).

Of course, FIG. 3 illustrates computing device 310, display device 320, and input device 330 as separate devices for ease of identification only. Computing device 310, display device 320, and input device 330 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 310 may be one or more servers, for example a farm of networked servers, a clustered server environment, or a cloud network of computing devices, configured to serve web pages and/or ad content.

Embodiments have been disclosed herein. However, various modifications can be made without departing from the scope of the embodiments as defined by the appended claims and legal equivalents.

What is claimed is:

1. A system for organizing asset data, the system comprising:
    a database storing asset data items in an ontological index defining relationships between individual asset data items, wherein the relationships are defined based on metadata associated with each asset data item, and wherein each asset data item represents an item comprising a product, a service, an article, video content, a website, user generated content, or an advertisement; and
    at least one computer processor;
    at least one memory operatively coupled to the at least one computer processor and having computer readable instructions stored thereon which, when executed by the at least one processor, cause the at least one processor to:
        receive information over a distributed network from a social graph of one or more social media platforms that are external to the database to identify a user review stored in the one or more social media platforms and corresponding to an individual item not represented by an asset data item in the ontological index;

determine, based on the user review of the individual item, one or more correlative relationships between the individual item and at least one asset data item in the ontological index;

generate a new asset data item representing the individual item, including metadata for the new asset item based on the one or more correlative relationships; and store the new asset data item in the database in a manner that is integrated into the ontological index.

2. The system of claim 1, wherein the instructions further cause the one or more processors to determine a strength of the user review by based on information in the one or more social media platforms.

3. The system of claim 2, wherein the strength of the user review is determined by a number of positive indicators attributed to the user review.

4. The system of claim 3, wherein the metadata for the new asset item indicates the strength of the user review.

5. The system of claim 4 wherein the strength of the user review at least partially defines a strength of the one or more correlative relationships between the individual item of the new asset data item and at least one other asset data items in the ontological index.

6. A computer-implemented method for organizing asset data, the method executed by one or more processors and comprising:

storing asset data items in an ontological index defining relationships between individual asset data items, wherein the relationships are defined based on metadata associated with each asset data item, and wherein each asset data item represents an item comprising a product, a service, an article, video content, a website, user generated content, or an advertisement;

receiving information over a distributed network from a social graph of one or more social media platforms that are external to the database to identify a user review stored in the one or more social media platforms and corresponding to an individual item not represented by an asset data item in the ontological index;

determining, based on the user review of the individual item, one or more correlative relationships between the individual item and at least one asset data item in the ontological index;

generating a new asset data item representing the individual item, including metadata for the new asset item based on the one or more correlative relationships; and storing the new asset data item in the database in a manner that is integrated into the ontological index.

7. The computer-implemented method of claim 5, further comprising determining a strength of the user review by based on information in the one or more social media platforms.

8. The computer-implemented method of claim 7, wherein the strength of the user review is determined by a number of positive indicators attributed to the user review.

9. The computer-implemented method of claim 8, wherein the incorporated metadata indicates the strength of the user review.

10. The computer-implemented method of claim 9 wherein the strength of the user review at least partially defines a strength of the one or more correlative relationships between the individual item of the new asset data item and at least one other asset data items in the ontological index.

11. A non-transitory computer-readable medium storing instructions that, when executed by one or more processors, performs a method including:

storing asset data items in an ontological index defining relationships between individual asset data items, wherein the relationships are defined based on metadata associated with each asset data item, and wherein each asset data item represents an item comprising a product, a service, an article, video content, a website, user generated content, or an advertisement;

receiving information over a distributed network from a social graph of one or more social media platforms that are external to the database to identify a user review stored in the one or more social media platforms and corresponding to an individual item not represented by an asset data item in the ontological index;

determining, based on the user review of the individual item, one or more correlative relationships between the individual item and at least one asset data item in the ontological index;

generating a new asset data item representing the individual item, including metadata for the new asset item based on the one or more correlative relationships; and storing the new asset data item in the database in a manner that is integrated into the ontological index.

12. The non-transitory computer-readable medium of claim 11, wherein the instructions further cause a processor to determine a strength of the user review by based on information in the one or more social media platforms.

13. The non-transitory computer-readable medium of claim 12, wherein the strength of the user review is determined by a number of positive indicators attributed to the user review.

14. The non-transitory computer-readable medium of claim 13, wherein the metadata indicates the strength of the user review.

15. The non-transitory computer-readable medium of claim 13, wherein the strength of the user review at least partially defines a strength of the one or more correlative relationships between the individual item of the new asset data item and at least one other asset data items in the ontological index.

* * * * *